United States Patent [19]

Zuckerman et al.

[11] 4,151,080
[45] Apr. 24, 1979

[54] SYSTEM AND APPARATUS FOR CONTROL AND OPTIMIZATION OF FILTRATION PROCESS

[75] Inventors: Matthew M. Zuckerman, Palo Alto; Leslie C. Hamer, San Jose, both of Calif.

[73] Assignee: Enviro Development Co., Inc., Mountain View, Calif.

[21] Appl. No.: 877,168

[22] Filed: Feb. 13, 1978

[51] Int. Cl.² .................. B01D 25/12; C02B 1/18; C02B 3/06; C02C 1/40
[52] U.S. Cl. .................. 210/59; 210/65; 210/96 R; 210/101; 210/102; 210/105; 210/111; 210/137
[58] Field of Search .......... 210/96 R, 97, 98, 101, 210/102, 105, 42 R, 137, 111, 22 R, 65, 71, 86, 87–89, 103, 134, 109, 138, 139, 140, 143, 198 R, 224, 59; 23/230; 162/258, 259; 137/9; 222/130

[56] References Cited

U.S. PATENT DOCUMENTS

| | | | |
|---|---|---|---|
| 3,256,902 | 6/1966 | Porter | 210/96 R |
| 3,393,149 | 7/1968 | Conley et al. | 210/96 R |
| 3,441,136 | 4/1969 | Serfass et al. | 210/137 |
| 3,502,210 | 3/1970 | Busse et al. | 210/137 |
| 3,605,775 | 9/1971 | Zaander et al. | 210/96 R |
| 3,677,406 | 7/1972 | King et al. | 210/96 R |
| 3,759,387 | 9/1973 | Drayton | 210/98 |
| 3,957,637 | 5/1976 | Morey | 210/137 |
| 3,992,301 | 11/1976 | Shippey et al. | 210/23 H |
| 4,021,341 | 5/1977 | Cosentino et al. | 210/103 |
| 4,045,342 | 8/1977 | Küster et al. | 210/96 R |

FOREIGN PATENT DOCUMENTS

| | | | |
|---|---|---|---|
| 2332202 | 1/1975 | Fed. Rep. of Germany | 210/96 R |
| 562298 | 7/1974 | U.S.S.R. | 210/96 R |
| 505427 | 10/1976 | U.S.S.R. | 210/96 R |

*Primary Examiner*—Frank Sever
*Attorney, Agent, or Firm*—Donald C. Feix

[57] ABSTRACT

A process control apparatus and system for dewatering a solids ladened slurry of water and waste water embodying one or more of four primary process control techniques, depending upon the particular process application.

The four process control techniques are (1) monitoring of the instantaneous solids concentration increase in the dewatering unit, (2) measurement of the rate of change of the solids concentration increase with respect to time, (3) controlled pumping to produce a substantially constant flow rate in the effluent from the dewatering unit until the terminal dewatering pressure is reached, and (4) variation of the amount of conditioning agents added to the influent slurry in response to one or more control signals derived from other components of the dewatering system and apparatus.

12 Claims, 2 Drawing Figures

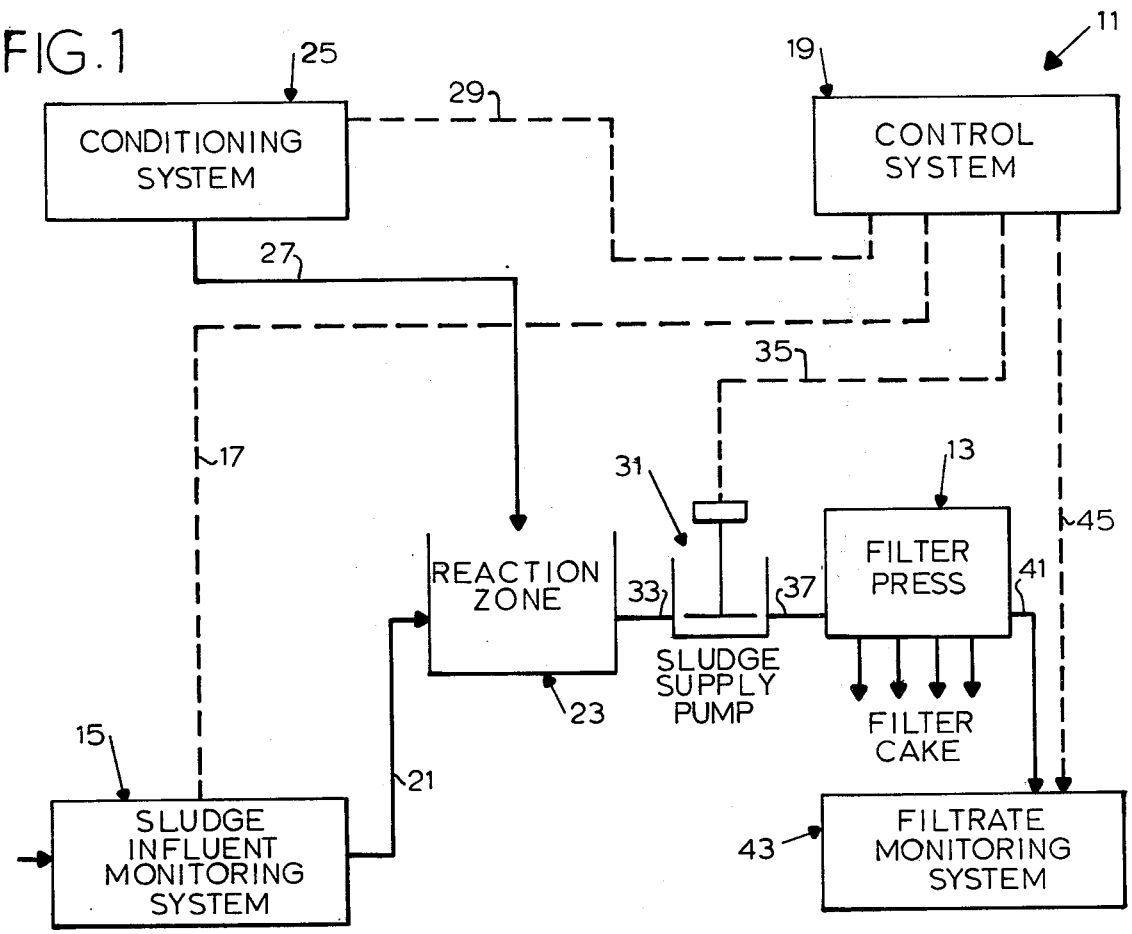
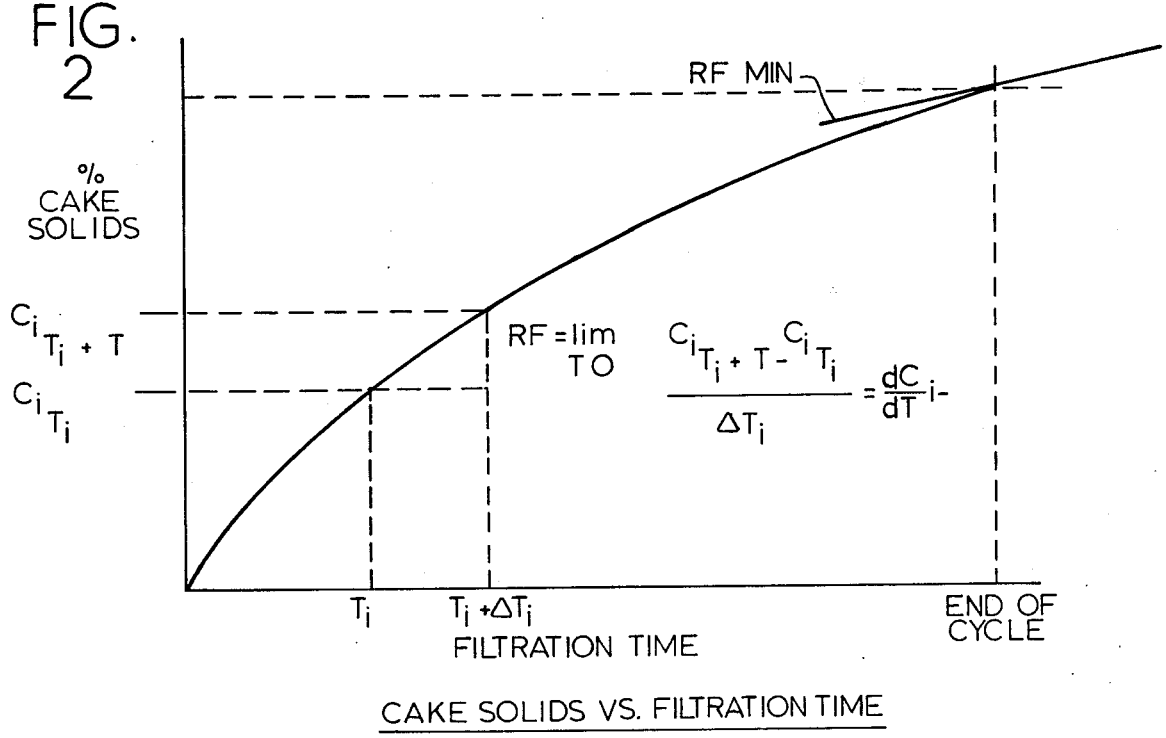
CAKE SOLIDS VS. FILTRATION TIME

SYSTEM AND APPARATUS FOR CONTROL AND OPTIMIZATION OF FILTRATION PROCESS

BACKGROUND OF THE INVENTION

The present invention is related to and is specifically directed to a process control in an apparatus and in a system for separating a liquid/solid slurry.

The present invention relates to equipment of the kind in which the solids are removed from the slurry and are concentrated in the separating equipment.

In equipment of this kind, an influent solids ladened slurry is pumped, or otherwise fed, to an inlet of the dewatering equipment. These solids are removed from the slurry in the dewatering equipment and are concentrated within the dewatering equipment so that a relatively solids-free effluent flows from the outlet of the dewatering equipment.

The present invention relates to and is used in both continuous flow and batch flow dewatering processes.

Thus, the present invention relates to continuous flow dewatering processes such as belt presses, centrifuges, vacuum filters, sand filters and other liquid/solids separation equipment.

The present invention also relates to batch flow or cycle liquid/sold separation processes such as those utilizing a filter press.

However, in most batch flow processes some control of the pumping is usually desirable, to maximize the build-up of the cake solids in the shortest period of time or to avoid choking of the filter cloth.

A programmed control of the pump pressure build-up to avoid choking of the filter cloth is disclosed in detail in co-pending U.S. application Ser. No. 836,506 filed Sept. 26, 1977, by Zuckerman et al., and entitled "Slurry Dewatering Apparatus and Control System" and assigned to the same assignee as the assignee of this present application.

The present invention also relates to dewatering processes involving different types of liquid/solid slurries or sludges, such as relatively incompressible sludges and relatively compressible sludges. The present invention also relates to slurries which may require the addition of conditioning agents to enhance the separation process (such as organic municipal sewage sludges) and to other types of slurries that generally do not require the addition of conditioning agents (such as inorganic coal slurries and paper mill primary sludges).

There is a need for process control in both continuous flow and in batch flow dewatering applications. In the prior art much of the operation of the dewatering equipment is based on pilot studies or preset operating parameter set from similar applications or fixed during start-up which do not take into account or provide for changing conditions occurring in the actual operation of dewatering processes.

As a result, the prior art separation methods and apparatus have presented a number of problems.

In some cases the prior art methods and apparatus have not produced a product to meet certain requirements, for example, a high enough percent of solids concentration to meet requirements for land fill or for incineration of the filtered solids without the need for supplemental fuel.

The prior art methods and apparatus in some cases have not produced maximum yields with a desired minimum requirement of power.

The prior art methods and apparatus in some cases also have not produced the throughput capacity required.

Some of the problems associated with prior art separation methods and apparatus can perhaps best be illustrated by considering a specific batch flow dewatering method and apparatus using a filter press.

The use of a filter press for dewatering slurries is a well known method.

A filter press dewatering system, generally speaking, consists of a filter press, a pumping system to feed slurries to the filter press and slurry conditioning system.

The major components of a filter press are the filter press frame, filter cloth, filter plates and the hydraulic closing system.

The filter plates are so designed as to form a series of cloth covered chambers. A solids ladened liquid or sludge is pumped to one side of the cloth, and relatively solid-free liquid is removed from the other side of the cloth.

The hydraulic cylinder and frame are so constructed as to keep the plates in a closed filter pack which allows the dewatering of the sludge to occur.

Dewatering in a filter press of this kind is accomplished by pumping the slurry under pressure to one side of the cloth and by removing filtrate from the other side of the cloth at essentially atmospheric pressure. The pressure differential causes the slurries to physically give up water.

Typical terminal sludge feed pressures are in a range between 7 to 15 atmospheres.

During the filtration cycle dewatered sludge builds up on the sludge side of the cloth until a cake is formed between adjacent filter plates.

Typical filter press pumping systems consist of piston pumps working in combination with an equalization tank, or high capacity centrifugal pumps working in combination with piston pumps, or piston or diaphragm pumps designed to pump at a maximum rate of flow that the filter press can receive.

The conventional prior art is to terminate the filter press filtration process under one of the following methods:

(a) A fixed, filtration cycle time based on a pre-set timer. Typical filtration times are 30 minutes to 3 hours.
(b) Measure the flow of filtrate from the filter press and terminate the filter press operation when the filtrate flow falls below a pre-determined rate (for example, a certain number of gallons per minute per square foot of filtration area times the number of chambers). Typically, the minimum flitrate flow is calculated at 0.01 to 0.05 gpm/square foot of filtration area in the filter press.

The objective of filtration is to produce a slurry cake which is substantially dry.

In the prior art it has been possible to determine the dryness of the filter cake (at various intermediate points during the cycle) only after the filtration cycle has been completed. Thus, typically in the prior art, a pilot cycle was run and the resulting cake was then burned in an oven to determine the percent of solids as related to the percent of moisture. Then, knowing the final percent solids concentration of the cake and knowing the total overall time of the cycle, intermediate cake concentration values could be calculated for various times in the cycle on a time ratio or effluent volume flow ratio basis.

This method of calculating intermediate solids concentration values at various points of time during the cycle has a number of drawbacks.

It is (as pointed out above) an after the fact type of determination.

It also rested on a number of assumptions. For example, it assumed a constant sludge feed concentration, but in actual process applications the percent of solids in the influent slurry can and do vary substantially.

The prior art also assumed a specific gravity of 1.0 for the sludge, but in actual practice the specific gravity is always greater than 1.0 and varies.

Also, as a practical matter, the nature of the solids in the influent slurry can change in process; and this affects the dewaterability of the slurry. For example, an increase in the amount of incompressible sand or grit in municipal sewage, or a change in the nature of the sludge itself, such as the sludge becoming septic and thus more difficult to dewater, can have a substantial impact on the instantaneous increase in solids concentration in the filter press at any particular point in time or over any particular interval in time.

Thus, prior art method for terminating the filtration process in a filter press (on either a fixed, pre-determined time basis or on the measurement of flow of filtrate basis) could result in the actual cake solids concentration varying substantially from that produced during the pilot run or from the preset parameters from similar applications or fixed during start-up.

SUMMARY OF THE PRESENT INVENTION

It is a primary object of the present invention to make qualitative and quantitative measurements of parameters around the liquid/solid separation unit and to utilize these parameters to indicate and to control the actual in process performance of the separation apparatus and system.

The present invention provides four primary parameters of control for separation processes and equipment. These four parameters are:

(1) Continuous monitoring of the actual increase of solids concentration within the dewatering unit, (2) Measuring the rate of change of solids concentration increase with respect to time within a filter press, (3) Controlled pumping of the influent slurry to a filter press to maintain a substantially constant flow rate in the effluent from a filter press, and (4) Control of the amounts of conditioning agents added to the influent slurry in response to one or more other conditions of the separation process and equipment.

Depending upon the particular separation process involved and the nature of the slurry, one or more of these four primary parameters may be used separately, or in combination with one or more other parameters, for process control purposes.

It is a specific objective of the present invention to maximize the yield of a filter press by minimizing the operating time to reach a cake solids objective.

It is another specific objective of the present invention to provide the flexibility to produce optimum yield and to be responsive to a range of input solids concentrations in the influent slurry.

It is another important objective of the present invention to minimize power requirements in a filter press by reaching a desired cake solids solids objective in a minimum of time.

It is a still further objective of the present invention to produce maximum utilization of available equipment, by improving product yield, thus reducing the need for capital expenditure for additional equipment.

In a batch process dewatering unit, such as a filter press, the duration of the pumping and dewatering cycle in accordance with the present invention is preferably controlled in response to monitoring of the cake solids increase within the filter press. In one specific embodiment of the present invention the cycle is terminated when the desired concentration of cake solids are obtained.

The continuous readout of the actual instantaneous cake solids increase in accordance with the present invention is combined, in one embodiment of the invention, with a regulation of a conditioning system to add conditioning agents to the influent slurry in increasing or decreasing amounts depending on whether the slurry separates worse than or better than designed.

In processes in which the separation unit is a filter press, the measurement of the rate of change of solids concentration increase with respect to time within the filter press (hereinafter referred to as the Resource Factor readout) is also combined with cake solids monitoring (as described above). This combination of controls terminates the cycle when a specified minimum Resource Factor (that is, a minimum rate of change of cake solids increase with respect to time) is achieved, even though the desired amount of cake solids has not been achieved. This Resource Factor override termination avoids operation in the decreasing returns range where energy is wasted. Further the Resource Factor method shortens cycle time to permit increased cycles and increased throughput of the system.

For filter press process applications the Resource Factor control can be used separately and without the cake solids monitoring but for many practical applications the Resource Factor control can be used in conjunction with the cake solids monitor.

In one mode of operation the present invention uses the Resource Factor to erminate the cycle at a preset minimum Resource Factor.

The minimum Resource Factor control terminates the cycle for a condition in which the dewatering is worse than designed. In this event the system gets less cake solids than designed, but it conserves energy and maintained desired throughput capacity.

For a sludge better than designed the cycle is terminated when the cake solids reaches the preset value and fthe equipment is free to dewater additional sludge.

As noted above, the present invention also uses a combination of cake solids monitoring and Resource Factor monitoring. The cake solids monitoring provides the controlling signal if the rate of separation is better than designed. The Resource Factor monitoring provides the terminating signal if the rate of separation is worse than designed.

The set point of the minimum Resource Factor and the set point of the governing cake solids can also be varied, in accordance with the present invention, and while separation is in process.

With some separation equipment, such as a belt press, vacuum filter, centrifuge, or certain other liquid-solid separation units, the separation process is achieved with a continuous flow through the separation unit. Since this type of separation system is not a batch process, but is instead a continuous flow process, the controlled pumping system is generally not critical. In process applications of this kind the present invention provides a continuous monitoring of the resulting filtered solids concentration. However, there are numerous machine parameter such as belt tension for belt press, submergence for vacuum filters and pool depth of differential schroll speed for centrifuge which can be varied to produce changes in performance. The signal provided by the monitoring of the filtered-solids concentration in the separation unit is used, in accordance with one embodiment of the present invention, to control the conditioning or one or more of the above identified machine parameters of the influent liquid/solid mixture of the slurry to either increase the amount of conditioning agents added and/or vary the machine parameter if the slurry separates worse than designed or to decrease the amount of conditioning agents added if the slurry separates better than designed.

The present invention provides a number of controls for varying the amount of conditioning agents added to the influent slurry to enhance the separation of the liquid phase from the solids phase by structuring the solids phase to permit ease of dewatering.

In one specific embodiment the amount of conditioning agent or agents added is varied in response to changes in the percent solids in the influent slurry.

The conditioning control and cake solids monitoring are also used in combination in another embodiment of the present invention for two conditions of separation. If the actual separation process is better than designed, then the cake solids monitoring signal causes the conditioning system to add less conditioning agent. If the separation process is worse than designed, then the cake solids monitoring signal provides for the addition of greater conditioning agents.

If the slurry does not separate as well as designed (for example, if sludge goes septic) then this combination system is used to maintain the throughput rate. (In this event, over conditioning is used to maintain the desired throughput).

Alternatively, the Resource Factor override is used to permit lower cake solids in the case of a filter press dewatering unit. In addition, the Resource Factor set point can be lowered to get more cycles per day as described above.

The override can thus be either cake solids monitoring or from Resource Factor monitoring to override the set point of the conditioning system (as responsive to percent of solids in the influent slurry) to get back to the throughput rate desired.

In another embodiment, the present invention uses a pumping system which is related to the type of slurry. For certain slurries some of which are included in a class as incompressible, and the dewatering apparatus incorporates a filter press, then the present invention utilizes a pumping system control which varies the pumping pressure build-up to maintain a constant effluent flow rate out of the dewatering unit during the build-to-maximum pumping pressure; and this constant effluent flow rate maximizes the efficiency of build up or increase of cake solids in the filter press.

For certain other sludges some of which are included in a class as compressible sludge, the pumping system uses a programmed pressure build-up of the pumping pressure into the filter press (such as described in more detail in pending U.S. application Ser. No. 836,506 filed Sept. 26, 1977 by Zuckerman et al. and assigned to the same assignee as the assignee of this application as noted above). This programmed pressure build-up avoids a blinding or choking of the filter cloth in a filter press and also provides a faster build-up of cake solids within the filter press than would be obtained with a conventional fast pressure build-up of filter press inlet pressure.

A process control apparatus and system for separating a solids ladened slurry and incorporating the structure and techniques described above and effective to function as described above constitute further specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a schematic view showing the principle components and interrelationships of the process control apparatus and system of one embodiment of the invention; and FIG. 2 is a graph illustrating a typical increase of solids concentration versus filtration time for a filter press dewatering unit. FIG. 2 further illustrates how a Resource Factor control signal is obtained as a measure of the rate of change of solids concentration increase with respect to time within the filter press.

DESCRIPTION OF THE PREFERRED EMBODIMENTS

A process control apparatus and system for separating a solids ladened slurry and constructed in accordance with one embodiment of the present invention is shown in FIG. 1 and is indicated generally by the reference numeral 11 in FIG. 1.

The system 11 shown in FIG. 1 incorporates a filter press 13 as the separation unit, but (as pointed out above in the Summary of the Invention) some features of the invention are not limited to a filter press type of separation unit but are instead equally applicable to other separation equipment, such as belt presses, centrifuges, and vacuum filters.

The objective of filtration with a filter press is to produce a filter cake which is substantially dry.

The dry solids concentration at the end of the filtration cycle can be determined by weighing a sample, heating the cake in an oven to drive off the moisture then reweighing the sample.

Once the terminal dry solids of the cake is known, the dry solids concentration in the cake at various points in time ($T_i$) during the filtration cycle in which that cake was formed can be back-calculated by the following equation:

$$C_i = \frac{V_i + V_p}{V_f + V_p} (C_f)$$

$C_i$ = Intermittent cake concentration (weight % dry solids)

$V_i$ = Cummulative filtrate volume (liters) at time $T_i$ $T_i$ = Time from start to filtration pumping into the filter press to some point in time (i) (minutes)
$T_f$ = Time from start of filtration pumping to end of filtration pumping (minutes)
$V_p$ = Volume of press (liters)
$C_f$ = Cake solids concentration at time $T_f$ (weight % dry solids)
$V_f$ = Cummulative filtrate volume at time $T_f$ (liters)

The following is an example of utilization of this equation:

Data

|  | $V_p$ = 1 liter |
|  | $C_f$ = 40% |
| $T_i$ | $V_i$ |
| Mins | Liters |
| 0 | 0 |
| 2 | 1 |
| 4 | 2 |
| 6 | 3 |
| 12 | 6 |
| 18 | 9 |
| 30 | 10.5 |
| 45 | 12 |
| 60 | 15 |
| 90 | 17.5 |
| 120 | 19 |
|  | $V_f$ = 19 liters |

Calculation at Time $T_i$ = 2 mins $$C_i = \frac{V_i + V_p}{V_f + V_p} (C_f)$$

$$C_i = \frac{1 + 1}{19 + 1} (40) = 4\%$$

at Time $T_i$ = 30 mins $$C_i = \frac{10.5 + 1}{19 + 1} (40) = 23\%$$

While this equation and method for determining the dryness or concentration of cake solids in a filter cake is useful for back calculating intermediate cake solids concentrations after the cake has been formed (and after the final dryness of that particular cake has been determined), it is not a really reliable formula or method for determining intermediate cake concentrations when the final cake dryness is not known. This formula and method assumes that there are no in-process changes during the cycle.

As a practical matter, the solids feed concentration (or percent of solids by weight in the influent slurry) can change substantially during a cycle, or in the course of several filtration cycles. A heavy rain for example can greatly effect the percent of solids in the influent slurry.

The present invention (as illustrated in FIG. 1 and as described in more detail below) permits the constant readout of cake solids and solids loading rate (pounds of dry solids per hour per square foot) content within the filter press.

The governing factors are the filter press volume ($V_p$) in liters, the sludge feed solids concentration ($C_s$) expressed as percent dry solids by weight, the sludge specific gravity ($S_s$), the dry solids concentration of the filtrate ($C_f$) expressed as percent dry solids by weight, the specific gravity of the filtrate ($S_f$), and the cumulative filtrate volume in liters at a given time "i" ($V_i$) following commencement of filtrate.

The mathematical relationship is given as:

$$C_i = \phi(V_p, V_i, C_s, S_s, C_f, S_f)$$

where $C_i$ = filter cake solids concentration at time $T_i$ (weight %, dry solids)

The mathematical expression is:

$$C_i = \frac{1}{1 + [S_s(100 - C_s)(V_p + V_i) - S_f(100 - C_f)V_i]/[S_sC_s(S_sC_s(V_p + V_i) - S_fC_fV_i]}$$

The simplified assumption of 100% solids capture within the press reduces the foregoing equation to the following form:

$$C_i = \phi(V_p, V_i, C_s, S_f, S_s)$$

which may be expressed as:

$$C_i = \frac{1}{1 + (100 - C_s)/C_s - S_fV_i(100)/S_sC_s/(V_p + V_i)}$$

A final simplified assumption of sludge feed specific gravity equal to that of water provides the following formulization for cake solids:

$$C_i = \phi(V_p, V_i, C_s)$$

which is written as:

$$C_i = \frac{(V_i + V_p)}{V_p} C_s$$

Thus, in order to optimize filtration, the information that is needed to determine the instantaneous percent solids in the filter press at any moment in time (and to measure the rate of change of cake concentration with respect to time, the Resource Factor as defined in more detail below) is (a) the percent of solids in the influent to the filter press,
(b) the measurement of the effluent cumulative volume at a given time
(c) the measurement of the effluent suspended solids concentration
(d) the volume of the filter press.

The present invention performs a continuous monitoring of the filter cake percent solids during the filtration cycle to insure that the percent solids in the cake is the percent solids desired, even though the percent solids in the influent to the filter press changes during the cycle.

In order to optimize filtration, in one specific embodiment of the invention as shown in FIG. 1, a continuous monitoring of the incoming sludge dry solids concentration is performed by a sludge influent monitoring system 15. The concentration ($C_s$) of the sludge is determined by photometric instrumentation such as the optronir model suspended solids analyzer manufactured by EDC/Enviro Development Co., Inc., Mountain View, California.

The sludge influent monitoring system may also use other means for determining the concentration of dry solids in the incoming slurry. For example, sonar instrumentation may be used or radioactive techniques may be used.

Monitoring system 15 produces a signal representing the solids concentration in the influent slurry, and this signal is transmitted on line 17 to control system 19.

The influent slurry flows from the monitoring system 15 through a line 21 and to a reaction zone 23.

A conditioning system 25 is, in the embodiment shown in FIG. 1, associated with the reaction zone by a line 27 so that the conditioning system can add conditioning agents to the influent slurry in the reaction zone 23 to enhance the dewaterability of certain types of sludge (such as organic municipal sewage sludges) by structuring the solids phase to permit ease of separation of the solid phase from the liquid phase.

In a preferred embodiment of the present invention, as illustrated in FIG. 1, the conditioning system 25 is connected to the control system 19 by a control line 29 so that the amount of conditioning agent or agents added is regulated by a signal from the control system 19 which is based on logical integration of one or more signals received by the control system, including the percent solids concentration in the solids concentration signal in the influent slurry as transmitted to the control system by the line 17.

The influent slurry is transmitted from the reaction zone 23 to a sludge supply pump 31 through a line 33.

The sludge supply pump 31 is associated with the control system by a control line 35 which controls the output pressure and volume of the supply pump 31.

The influent slurry is conducted from the output of the pump 31 to the inlet of the filter press 13 by a line 37.

The filter press 13 comprises (as described above in the introductory part of this application) a filter press frame, filter cloths, filter plates and a hydraulic closing system. The filter plates form a series of cloth covered chambers into which the solids ladened sludge from the line 37 is pumped. The sludge is pumped to one side of the cloth in a chamber and a relatively solid-free liquid is removed from the other side of the cloth in the chamber. The hydraulic closing system keeps the plates in a closed filter pack which allows the dewatering of the sludge under pump supply pressure to occur. Thus, during the filtration cycle, dewatered sludge builds up on the sludge side of the cloth until a cake is formed between adjacent filter plates.

The effluent from the filter press 13 is conducted through a line 41 to a filtrate monitoring system 43.

The filtrate monitoring system 43 measures the rate of flow of the effluent from the filter press 13, and transmits a signal representing this measurement to the control system 19 over a line 45.

The control system 19 with the measurement of calculated recumulative flow versus time from the filtrate flow rate signal of the effluent (as received on the line 45) correlates the percent solids concentration signal of the influent slurry (as received over the line 17) and with the known volume of the filter press 13 which is imputed by a thumbwheel located in the control system 19 to provide a continuous monitoring signal proportional to the solids concentration in the filter press 13.

In certain process applications this cake solids concentrations is displayed; in other process applications the monitored cake solids concentration is not displayed but it is further processed by process logic circuitry for automatic control of one or more components of the system 11. In other applications the cake solids concentration signal is displayed and further processed to be a control signal.

Thus, in one specific embodiment, the continuously monitored solids concentration increase in the filter press 13 is used by the control system 19 to stop the sludge supply pump 31 and to terminate the cycle automatically when the desired solids concentration is attained.

In another specific embodiment of the invention as illustrated in FIG. 1, the monitored solids concentration signal is further processed by logic circuitry in the system 19 to regulate the conditioning system 25 to obtain optimum feed ratios of conditioning agent to provide an acceptable sludge filtration. This permits economic optimization of the conditioning system, thus avoiding the costly waste of chemicals which results from the poor liquid/solids separation performance which results from over-conditioning and under-conditioning.

One preferred embodiment utilizing further processing of the signal by the logic circuitry is the production of the Resource Factor which is the rate of change of cake solids concentration within the filter press 13 with respect to time.

The Resource Factor control signal is used by the control system to terminate the cycle under certain conditions.

For example, if the build up of the solids concentration is requiring excessive time or is requiring an unacceptable amount of energy, the Resource Factor control signal is used to terminate the cycle at a certain Resource Factor set point, even though the set point for termination of the cycle at the desired solids concentration has not been reached.

Two conditioning agents that are commonly added to municipal sludge are ferric chloride and calcium hydroxide.

The signal provided by the monitoring filtered-solids concentration in the filter press 13 is used, in accordance with one embodiment of the present invention, to control the conditioning of the influent solid mixture of the slurry to either increase the amount of conditioning agents added if the sludge dewaters worse than designed or to decrease the amount of conditioning agents added if the sludge dewaters better than design condition.

In some cases, this association between the solids concentration increase in the filter press and the conditioning system may also be used to increase the throughput by causing a faster build up of solids in the filter press or to insure that the cake product meets certain requirements, such as incineration or land fill requirements, by assuring that cake is produced which meets the required cake solids concentration.

A further embodiment of the present invention results from the use of the conditioning system 25 in some process applications, independently of the monitoring of the solids concentration increase in the particular dewatering unit. The conditioning system in this process applications may be associated only with the sludge influent monitoring system 15 to vary the amount of conditioning agent or agents added in response only to changes in the influent slurry.

While not shown in FIG. 1, the monitoring of the final cake solids concentration in the filter press before discharge can also be used by the control system 19 to feed a signal forward to a furnace in which the cake from the filter press is to be burned to provide improved incineration of the cake solids. The control signal can be used to control such furnace machine parameter as air flow to assure complete combustion.

FIG. 2 is a graph showing the increase of the filtered cake solids concentration versus the filtration time.

The resource factor is the rate of change of the slope of the curve at a particular point on the curve, and the limiting set point for the minimum resource factor is indicated in FIG. 2 by the slope of the curve at the intersection of the line indicated by the legend $RF_{min}$.

At a given point in the filtration cycle, the rate of increase of cake solids concentration with respect to time (expressed as the derivative $dC_i/dT$ and termed the resource factor as noted above) does not justify the continued expenditure of energy to operate the dewatering system.

The minimum resource factor will depend on many factors including the following factors of the sludge: type, nature of solids, chemical composition, concentration, conditioning. The selection of a minimum resource factor further depends on the use of the sludge cake (e.g., whether land fill or incineration). The value of the minimum resource factor is determined experimentally for each sludge or for class of sludges described by factors such as listed earlier in this paragraph. Once established the resource factor is entered into the Control System 19 by a device such as a thumb wheel and is referenced in the control logic. The resource control can also be used to control for a dewatering condition in which the dewatering is better than designed, and the result is to get a greater production of cake solids than the design condition. In this embodiment, the control of the cycle time is solely by the minimum and the maximum resource factor set points without terminating at a given solids concentration increase set point.

In another specific embodiment of the present invention, the control system 19 controls the sludge supply pump 31 during the build-to-terminal pressure stage to maintain a constant effluent flow rate, out of the filter press 13 which is measured by the filtrate monitoring system 43. This constant effluent flow rate maximizes the efficiency of the increase of the cake solids in the filter press for certain sludge which can be generally classified as incompressible.

In this embodiment the flow rate signal on the line 45 is used by the control system 19 to control the output of the supply pump 31 to maintain the constant effluent flow rate during the build-to-terminal and maximum pumping pressure. After the terminal pumping pressure is reached, the pump 31 continues to pump at that pressure until the end of the cycle.

The following example compares the present invention pumping system which maintains a constant effluent flow rate with a prior art pumping system of the kind in which the supply pump 31 was used to fill the filter press rapidly at virtually maximum, uncontrolled output of the supply pump 31 during the build-to-terminal pressure stage.

In the following example the reference letter A indicates the present invention and the reference letter B indicates the prior art pumping system.

EXAMPLE

Sludge Type: Iron and Copper Hydroxide Sludge
Feed Solids Concentration = 4.4% Dry Solids
Press Volume 0.1104 ft.$^3$ = 2.94 liters

| Time | Pressure psi | | Cummulative Filtrate Flow, Liters | | Cake Solids % | | Resource Factor | |
|---|---|---|---|---|---|---|---|---|
| MINUTES | A | B | A | B | A | B | A | B |
| 0 | 0 | 0 | 0 | 0 | 0 | 0 | 0.63 | 0.51 |
| 15 | 125 | 50 | 6.22 | 4.5 | 9.5 | 7.7 | 0.29 | 0.25 |
| 30 | 186 | 92 | 10.5 | 8.1 | 13.9 | 11.5 | 0.21 | 0.20 |
| 45 | 195 | 101 | 13.5 | 11 | 17.1 | 14.5 | 0.17 | 0.15 |
| 60 | 204 | 110 | 16 | 13.2 | 19.7 | 16.8 | 0.15 | 0.13 |
| 75 | 204 | 190 | 18.2 | 15.8 | 22.0 | 19.5 | 0.13 | 0.14 |
| 90 | 215 | 222 | 20.0 | 17.8 | 23.9 | 21.6 | 0.13 | 0.14 |

EXAMPLE-continued

Sludge Type: Iron and Copper Hydroxide Sludge
Feed Solids Concentration = 4.4% Dry Solids
Press Volume 0.1104 ft.$^3$ = 2.94 liters

| Time | Pressure psi | | Cummulative Filtrate Flow, Liters | | Cake Solids % | | Resource Factor | |
|---|---|---|---|---|---|---|---|---|
| MINUTES | A | B | A | B | A | B | A | B |
| 105 | 220 | 225 | 22.0 | 19.8 | 25.9 | 23.7 | 0.13 | 0.14 |
| 120 | 224 | 222 | 23.5 | 21.5 | 27.5 | 25.4 | 0.11 | 0.11 |
| 135 | 225 | 219 | 25.0 | 23.0 | 29.1 | 27.0 | 0.11 | 0.11 |

A = present invention constant filtrate flow rate
B = State of the Art rapid fill pumping system The benefits of the present invention can be illustrated in the last line under the caption "Cake Solids" where it is seen that the present invention provides greater cake solids than the prior art pumping system in the same amount of time. Alternatively, the present invention can be used to obtain the same amount of cake solids as the prior art pumping system but in a shorter period of time than was required by the prior art pumping system.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A process control method of dewatering a solids ladened slurry of water and waste water in a filter press of the kind in which the solids are removed from the slurry and concentrated in the filter press, said method comprising, feeding an influent solids ladened slurry to an inlet of the filter press, removing the solids from the slurry in the filter press and concentrating the removed solids within the filter press, conducting a relatively solids-free effluent from the filter press, measuring the cumulative volume flow versus time of the effluent from the filter press, correlating the percent of solids in the influent with the measured cumulative volume flow versus time of the effluent to continuously monitor the solids concentration increase in the dewatering unit, and measuring the rate of change of solids concentration increase with respect to time within the filter press and generating a resource factor control signal from said measured rate of change of solids concentration increase.

2. The invention defined in claim 1 wherein the dewatering is performed in cycles and including terminating a dewatering cycle when the monitored solids concentration in the filter press reaches a certain amount.

3. The invention defined in claim 2 including controlling the pumping of influent into the filter press to maintain a substantially constant flow rate in the effluent from the filter press until the terminal pump pressure of the cycle is reached to thereby maximize the increase of solids within the filter press during the build-to-terminal pressure phase of the pumping operation.

4. The invention defined in claim 2 wherein the slurry is a relatively compressible sludge and including programming the build-up of pressure of the influent to the filter press to avoid a choking of the filter press and to maintain a substantially uniform dryness throughout the solids cake formed within the filter press.

5. The invention defined in claim 2 including producing a control signal from the monitored solids concentration increase in the filter press and feeding the control signal forward to a furnace in which the cake solids are subsequently burned to provide improved burning of the cake solids.

6. The invention defined in claim 2 including terminating the cycle at a certain minimum resource factor control signal set point even though the monitored solids concentration in the filter press has not reached said certain amount.

7. The invention defined in claim 2 including conditioning the influent slurry to enhance the separation of the liquid phase from the solids phase by adding a conditioning agent to structure the solids phase to permit ease of dewatering and controlling the amount of conditioning agent added in response to the resource factor control signal.

8. The invention defined in claim 1 wherein the dewatering unit is a continuous flow process unit.

9. The invention defined in claim 1 including conditioning the influent slurry to enhance the separation of the liquid phase from the solids phase by adding a conditioning agent to structure the solids phase to permit ease of dewatering and controlling the amount of conditioning agent added in response to the monitored solids concentration build-up in the dewatering unit.

10. A process control method of dewatering a solids ladened slurry of water and waste water in a filter press dewatering unit of the kind in which solids are removed from the slurry and concentrated in the filter press in dewatering cycles, said method comprising,
feeding an influent solids ladened slurry to an inlet of the filter press,
removing the solids from the filter press and concentrating the removed solids within the filter press,
conducting a relatively solids-free effluent from the filter press
measuring the rate of change of solids concentration increase with respect to time within the filter press,
generating resource factor control signal from said measured rate of solids concentration increase,
and terminating the dewatering cycle in response to the attainment of a minimum resource factor signal.

11. The invention defined in claim 10 including conditioning the influent slurry to enhance the separation of the liquid phase from the solids phase by adding a conditioning agent to structure the solids phase to permit ease of dewatering and controlling the amount of conditioning agent added in response to the resource factor control signal.

12. A process control apparatus and system for dewatering a solids ladened slurry of water and waste water in cycles in a filter press dewatering unit, said system comprising,
a filter press having an inlet, filter cloth chambers for removing solids from the slurry and for concentrating the removed solids in filter cakes within the filter cloth chambers, and an outlet,
influent feed means for feeding an influent solids ladened slurry to the inlet of the filter press,
effluent means for conducting a relatively solid-free effluent from the filter press,
measuring means for measuring the rate of change of solids concentration increase with respect to time within the filter press and for generating a resource factor control signal from said measured rate of solids concentration increase, and
control means for terminating the dewatering cycle in response to the attainment of a minimum resource factor signal.

* * * * *

UNITED STATES PATENT OFFICE
CERTIFICATE OF CORRECTION

Patent No. 4,151,080               Dated April 24, 1979

Inventor(s) Matthew M. Zuckerman; Leslie C. Hamer

It is certified that error appears in the above-identified patent and that said Letters Patent are hereby corrected as shown below:

Column 3, line 67, "cake solids solids" delete the second solids.

Column 4, line 41, "erminate" should read --terminate--.

Column 6, line 66, "$C_1 32$ Intermittent" should read $$--C_1 = \text{Intermittent}--.$$

Column 14, line 4, "press" should read --press,--;
          line 7 "generating resource" should read
                 --generating a resource--.

Signed and Sealed this

Twenty-fourth Day of July 1979

[SEAL]

Attest:

LUTRELLE F. PARKER
Attesting Officer     Acting Commissioner of Patents and Trademarks